United States Patent Office 2,890,478
Patented June 16, 1959

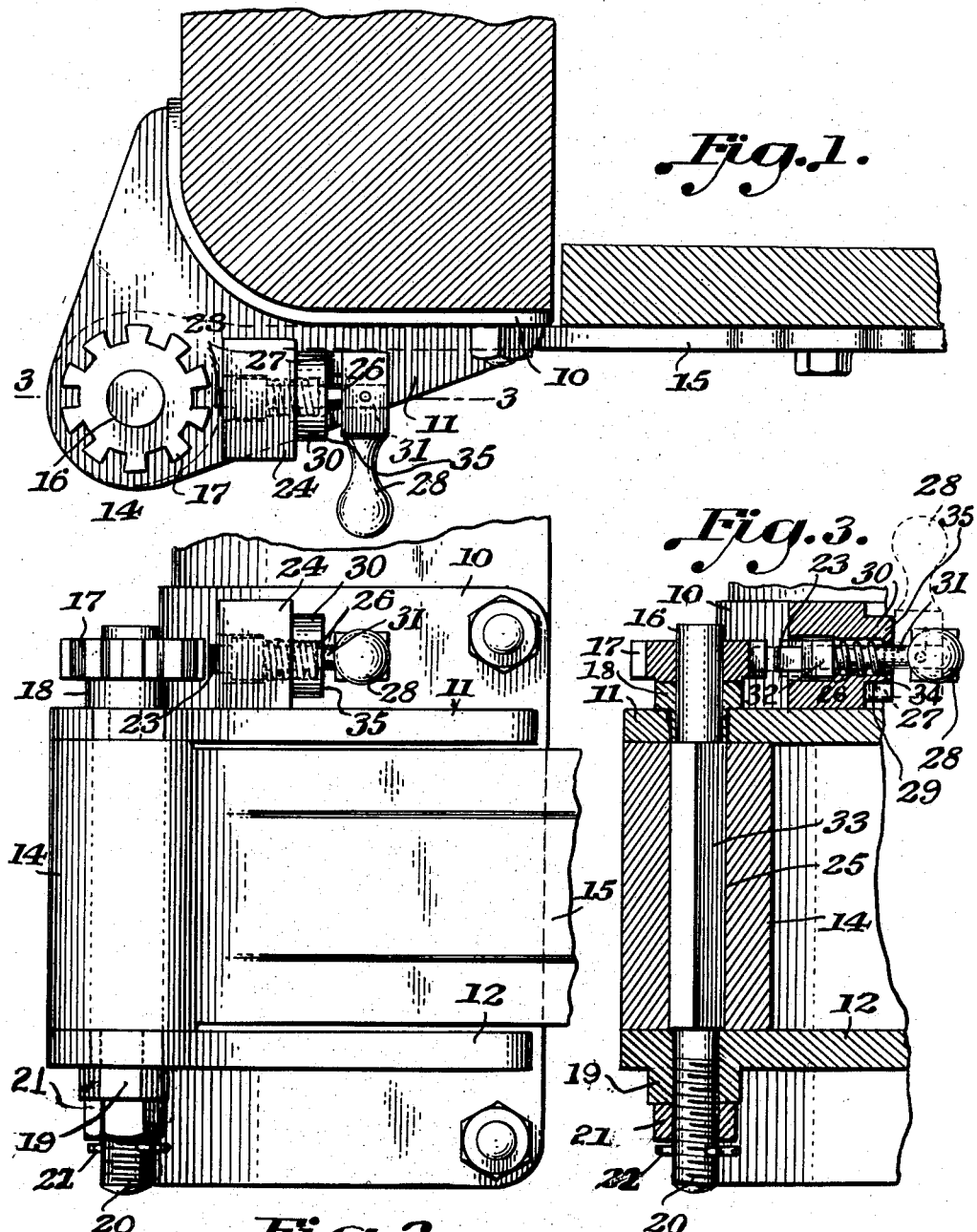

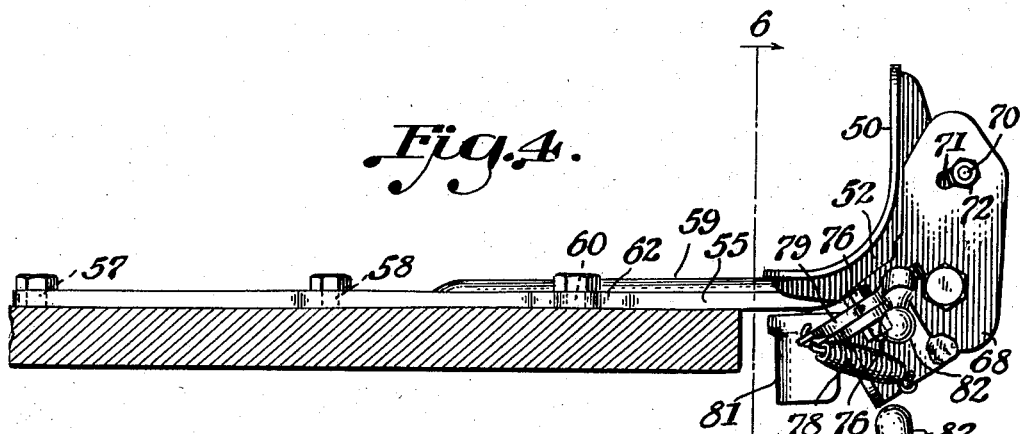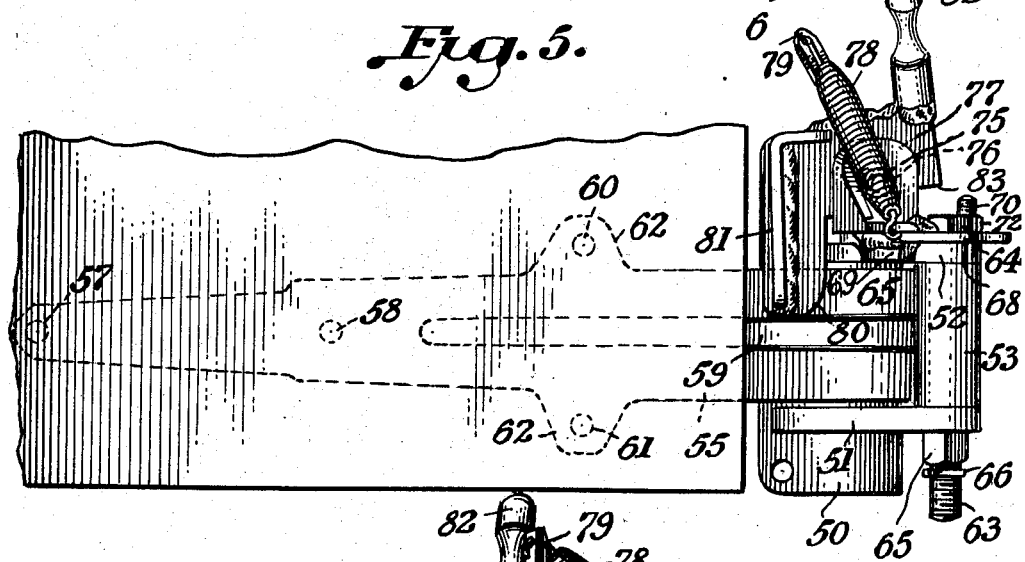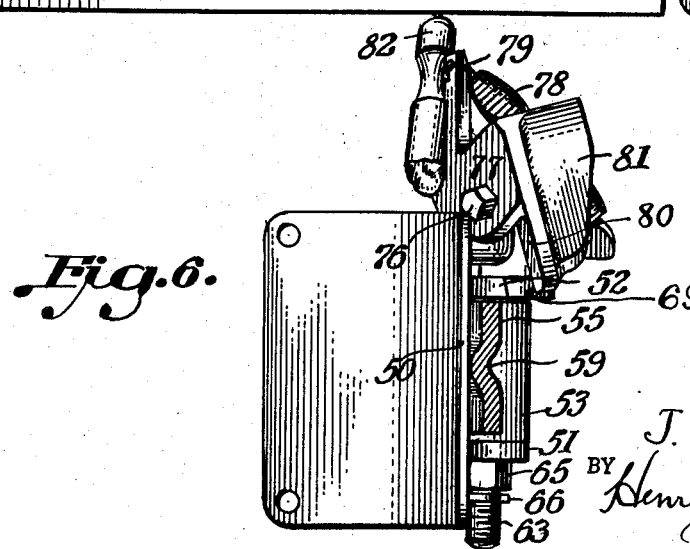

2,890,478

MANUALLY OPERATED LATCHING DEVICE FOR A TRUCK REAR DOOR

Jack R. Young, Columbia, S.C.

Application July 16, 1957, Serial No. 672,234

1 Claim. (Cl. 16—144)

This invention relates to the latching open of the rear doors of trailers and trucks and has for its principal object the provision of a device to replace the usual tie-back. This new latch may be operated while the driver is standing behind the truck out of danger from vehicles moving alongside and will insure against damage to the truck doors caused by the driver backing into a platform with the doors open but not adequately latched.

A further object of the invention is to provide means for avoiding the need for a driver or helper to feel for a tie-back in a blind position between the fully open door and the side of the trailer, this object being accomplished by locating the latching means between the rear post of the truck and the edge of the open door, thus affording ample opportunity to operate the latching device in full view while standing in the rear of the truck.

Another object of the invention is to provide means for latching truck rear doors in any one of a number of desired angular positions from closed to open. This provision includes means which will allow the doors to be latched rearwardly and parallel, as for example when a driver has backed into proper position but before he has had time to open and latch the doors another vehicle parks alongside, usually so close that the near wide truck door may not be swung to full tie-back position. Without the present latching device the driver would have to pull out of his space as he would not care to risk damage to the other vehicle by the swinging of his door, but with the present invention the driver could latch the proximate door at right angles to its closed position and be perfectly safe.

As trailers are usually built to be the full legal width of 96" and since such legal width would be appreciably exceeded with the rear doors tied back against the sides, no trailer should ever be pulled over the highways with the doors latched open. The practice has been for the driver to unlock the two rear doors at the center of the rear of the trailer in the usual manner, then walk with one door around to the full open position with the door close to the side of the trailer. The driver will then fasten the tie-back which at this time is located between the door and the trailer side in a blind spot requiring the driver to make the closure by feeling for the tie-back, as it is difficult to assume a position where he could see it. Unfortunately drivers do sometimes take a chance on backing up to a platform with the tie-backs not fastened and this practice has caused damage to a great many doors.

Under the present invention the mechanism for replacing the tie-back is part of the bottom hinge. It permits the driver to unlock the two doors and to swing them to full open position and then latch them in such position without having to move from behind the rear of the trailer. The invention contemplates latching doors not only in full open position but at any angles between fully open and fully closed, including obviously locking the doors at 90° from closed position and therefore 180° from fully open position.

In the drawings:

Figure 1 is a plan view;
Figure 2 is a side elevation;
Figure 3 is a vertical section through the pintle;
Figure 4 is a plan view of a modification;
Figure 5 is a side elevation thereof;
Figure 6 is a section on line 6—6 of Fig. 4, but with the latch raised.

In the form shown in Figures 1, 2, and 3 which is primarily intended for new equipment, the hinge includes a plate 10 carrying two brackets 11 and 12 receiving between them the cylindrical portion 14 of hinge blade 15. The plate 10 is secured to the post of the truck while the blade 15 carries the door in usual fashion, but the pintle 16 differs from normal in that it revolves with the door and blade. To best insure such action the central portion 14 of the hinge has a square hole 25 through it and the pintle head is a ratchet 17.

Bearings for the pintle are formed in bosses 18 and 19 extending outward from brackets 11 and 12 respectively. The lower end of the pintle is threaded as at 20 to receive a nut 21 held against loss by a cotter 22. The pawl 23 for the ratchet wheel 17 is housed in a block 24 rising from bracket 11 and is spring pressed as at 26 into locking engagement when the lug 27 on handle 28 is in registry with slot 29 in cylindrical extension 30 and the handle is upright. The spring 26 surrounds shaft 31 of the pawl in a bore between the enlarged head 32 and the bearing 34. The number of teeth on the ratchet may be varied but I prefer that the pawl shall be locked when the door is fully opened and also when the door is at right angles to the closed position. Ten teeth are ample as it is neither necessary nor advisable to have the pawl in locked position when the doors are closed.

As best seen in Fig. 3 the ratchet 17 is integral with the pintle 16 by welding or otherwise and it rides on the flat upper surface of boss 18. The pintle is cylindrical except at its threaded end 20 and at the portion between brackets 11 and 12 where the pintle is square in cross section as at 33 to fit snugly the hole 25 in the otherwise solid portion or sleeve 14 of the hinge blade.

In operation the pawl 23 is held retracted when the doors are closed by moving the handle to horizontal, in which position the lug 27 rides on the smooth outer face 35 of the block 24. With ten teeth in the ratchet 17 the door can be locked in full open position or 270°, with the doors straight back or 90°, and at six other positions, one being at 18° so as to avoid the pawl engaging the ratchet when the doors are closed. The handle 28 is at all times readily accessible to an operator standing in rear of the truck as it is located inward of the pintle and slightly farther behind the back of the truck. When the pawl engages the ratchet the handle 28 is erect.

In the form of latch shown in Fig. 4, which is preferred for adding to a truck already in use, the device is illustrated in connection with the type of hinge used on Fruehauf trailers including a plate 50 curved to fit the upright post of the trailer and carrying a pair of spaced brackets 51 and 52 receiving between the curved end or sleeve 53 of the elongated blade 55 of the hinge having a central rib 59 to give added strength and perforated as at 57 and 58 centrally and at 60 and 61 in the usual ears 62 to receive screws, bolts, or other means for securing the hinge blade to the door. The parts just described are conventional.

The pintle of the hinge is a bolt 63 having a head 64 and a nut 65 held in engagement with the bottom face of bracket 51 by a cotter pin 66. Resting on the upper bracket 52 against which it is secured by the pintle head 64 is a plate 68 forming the base of the added mechanism. Rotation of base 68 about the pintle bolt 63 is prevented by stops 69 and 70, the former being a lug welded to the bottom of the base 68 and the latter being a short bolt movable in a slot 71 and fastened in correct position by a nut 72, thus permitting quick assembly and removal.

In a lug 75 rising from the base plate is a pivot 76 upon which the latching lever 77 turns, being held in each of its two positions by a spring 78 acting as a toggle as it is secured to plate 68 and a finger 79 rising from lever 77 and being nearly vertical when the latch is in released position. The latch itself is a flat plate 80 integral with the lever and if desired reinforced by a strengthening rib 81. The latching lever 77 is readily operated from a position in rear of a partly opened door carried by hinge blade 55 by means of a handle 82 integral with the lever and extending about vertically when the door is latched in fully open position at which time the latch has moved down so as to engage the hinge blade on its door side but well clear of the proximate outer vertical edge of the door. Because of the angular position of the axis of the pivot 76 with relation to the plane of the door, about 45°, the bottom tip of the latch 80 as it moves downwardly moves inwardly toward the hinge blade touching it appreciably before full latched position; hence the latch is wedged in place when the handle 82 is pushed forward to vertical position. The latch is released by pulling the handle rearwardly until the point 83 of the lever strikes the plate 68. The toggle action on release is much less strong than when the latch is down and holding the door fully open.

To install the new unit on an existing hinge it is merely necessary to substitute for the original short pintle the longer bolt 63. The stop 69 prevents movement in one direction and the stop 70 is then moved to engage the bracket 52 and so fastened. Locking of the pintle bolt by the nut 65 secures the base 68 to the hinge but does not bind the sleeve 53, so the hinge blade turns freely on the non-rotating pintle bolt.

What I claim is:

A latch and hinge assembly for a rear door of a highway truck comprising a plate for attachment to a truck rear post, a pair of horizontal brackets roughly triangular in plan extending therefrom, a vertical pintle extending through both brackets and rotatable therein proximate the free corners of the triangular brackets and adapted to be secured to a door hinge to rotate therewith at all times as the pintle serves to pivot the truck door, a ratchet having alternate teeth and slots fast to the pintle, means for preventing vertical movement of the pintle, a housing fast to one of the brackets, a pawl movable in said housing, a spring urging the pawl to enter one of the slots in the ratchet, and manually operated means located in rear of the plate to hold the pawl retracted so the pintle with its door is free to rotate in the brackets, said pawl when released holding the door in open or an intermediate position, whereby an operator while standing behind the truck may latch or unlatch the door when it is in fully open position and thereby avoid the danger inherent in going to the side of the truck to reach between the fully opened door and the side of the truck for the usual tie-back.

References Cited in the file of this patent

UNITED STATES PATENTS

| | | |
|---|---|---|
| 416,120 | McNeil | Nov. 26, 1889 |
| 469,333 | Oat | Feb. 23, 1892 |
| 980,686 | Shine | Jan. 3, 1911 |
| 990,552 | Hassmann | Apr. 25, 1911 |
| 1,876,660 | Giltsch et al. | Sept 13, 1932 |
| 2,184,597 | Iglehart | Dec. 26, 1939 |

FOREIGN PATENTS

| | | |
|---|---|---|
| 507,736 | Germany | Sept. 24, 1930 |